US008635120B1

(12) United States Patent
Velummylum et al.

(10) Patent No.: US 8,635,120 B1
(45) Date of Patent: Jan. 21, 2014

(54) FILE SYSTEM MERCHANDISING

(75) Inventors: Piragash Velummylum, Seattle, WA (US); Johanna S. Olson, Bellevue, WA (US); Korwin J. Smith, Seattle, WA (US); James H. Wood, Seattle, WA (US); William D. Carr, Seattle, WA (US); Lucas B. Dickey, Seattle, WA (US); Wenlin Ma, Seattle, WA (US); Christopher G. Emery, Seattle, WA (US)

(73) Assignee: Amazon Technologies, Inc, Reno, NV (US)

( * ) Notice: Subject to any disclaimer, the term of this patent is extended or adjusted under 35 U.S.C. 154(b) by 178 days.

(21) Appl. No.: 13/049,251

(22) Filed: Mar. 16, 2011

(51) Int. Cl.
*G06Q 30/00* (2012.01)

(52) U.S. Cl.
USPC ........................................... 705/26.7

(58) Field of Classification Search
USPC ............................... 705/26.7, 27.1
See application file for complete search history.

(56) References Cited

U.S. PATENT DOCUMENTS

| | | | | |
|---|---|---|---|---|
| 6,438,579 | B1* | 8/2002 | Hosken | 709/203 |
| 6,484,149 | B1* | 11/2002 | Jammes et al. | 705/26.62 |
| 7,912,724 | B1* | 3/2011 | Moorer | 704/270 |
| 8,108,342 | B2* | 1/2012 | Salinas et al. | 707/621 |
| 8,484,222 | B1* | 7/2013 | Li et al. | 707/748 |
| 2003/0065578 | A1* | 4/2003 | Peyrelevade et al. | 705/26 |
| 2005/0102202 | A1* | 5/2005 | Linden et al. | 705/27 |
| 2007/0245035 | A1* | 10/2007 | Attaran Rezaei et al. | 709/238 |
| 2008/0189295 | A1* | 8/2008 | Khedouri et al. | 707/10 |
| 2008/0228587 | A1* | 9/2008 | Slaney et al. | 705/26 |
| 2009/0106200 | A1* | 4/2009 | Salinas et al. | 707/3 |
| 2009/0281973 | A1* | 11/2009 | Selinger et al. | 706/14 |
| 2010/0115037 | A1* | 5/2010 | Hull et al. | 709/206 |

OTHER PUBLICATIONS

Moon, S., "Spatial Choice Models for Product Recommendations," Dissertations Abstracts International, vol. 6407A, p. 2573.*
Meintanis, K.A., "Combining Metadata, Inferred Similarity of Content, and Human Interpretation for Managing and Listening to Music Collections," Dissertations Abstracts International, vol. 7202B, p. 981.*

* cited by examiner

*Primary Examiner* — Nicholas D Rosen
(74) *Attorney, Agent, or Firm* — Thomas|Horstemeyer, LLP.

(57) ABSTRACT

Disclosed are various embodiments that provide file system merchandising. A file service maintains file systems associated with file service accounts. When accessing content of the file system through a network page, the network page includes a merchandising recommendation that is based at least in part upon characteristic information associated with the requested content. The merchandising recommendation may also be based at least in part upon account behavior history associated with the file service account. A link may be included in the merchandising recommendation to initiate previewing of at least a portion of a recommended item and/or to initiate acquisition of the recommended item.

27 Claims, 9 Drawing Sheets

FILE SYSTEM MERCHANDISING

BACKGROUND

A file system is a method of storing and organizing computer files and their data. Traditionally, file systems have been tied to physical devices. For example, each floppy disk, optical disk, hard drive, flash drive, etc. may have a file system. When interrogated, the file system provides a listing of computer files present on the physical device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to merchandising in a file system. With the ubiquitous availability of network connectivity for computing devices, users are increasingly seeking ubiquitous availability for their data files. For example, users may want to listen to an audio data file from their smartphone, from their office workstation, from their laptop at home, and/or from other computing devices. However, users may be inconvenienced by having to carry around portable storage devices and connect them to their computing devices. In addition, it may be difficult to access a data file stored on a portable storage device from multiple computing devices.

Various embodiments of the present disclosure relate to remote storage of data files according to a utility computing model. A file system may be employed to provide access to data files stored in a cloud computing resource comprising a networked plurality of computing devices. By storing data files in such a file system, users may access the data files from any computing device that has network connectivity. The accessing, manipulation, and/or acquisition patterns may be used to generate merchandising recommendations regarding items for the user, which may be included as part of a network page indicating content of the file system. In the following discussion, a general description of the system and its components is provided, followed by a discussion of the operation of the same.

Figure 1:
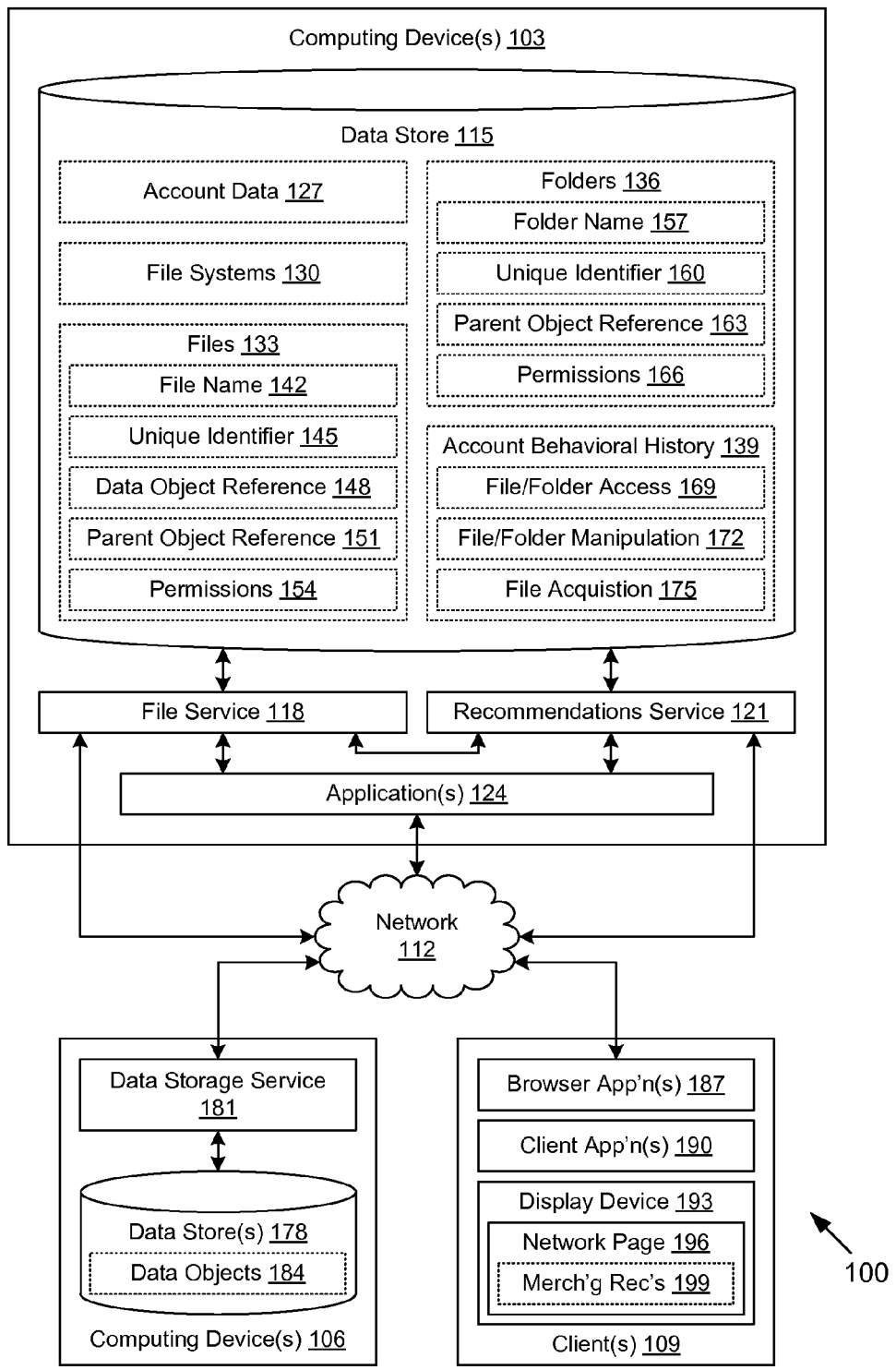
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115 includes, for example, data associated with the operation of the various applications and/or functional entities described below.

Components executed on the computing device 103 include, for example, a file service 118, a recommendations service 121, one or more applications 124, and other applications, services, processes, systems, engines, or functionality not discussed in detail herein. The file service 118 is executed to maintain a file organization of files and folders in file systems associated with file service accounts. To this end, the file service 118 may support various file-related operations such as, for example, creating files, deleting files, modifying files, setting permissions for files, downloading data files, and/or other operations. The recommendations service 121 is executed to provide merchandising recommendations, which may be based at least in part upon account behavioral history 139 such as file and/or folder access 169, file and/or folder manipulation 172, and/or file acquisition 175 associated with a file service account. To this end, the recommendations service 121 may support various operations such as, for example, storing, deleting, retrieving, and searching account behavioral history 139, and/or other operations. The recommendations service 121 also includes a recommendations catalog including a collection of items (e.g., music data files) that may be recommended for purchasing and/or sampling through the file service 118. The recommended items may be acquired through an online retailer associated with the computing device 103. The recommendations catalog also includes characteristic information about the recommended items such as, but not limited to, an image, a title, and/or other characteristic data/information describing item. The characteristic information may also include taxonomy information associated with each catalog item such as, but is not limited to, taxonomies, descriptions, product details, metadata, keywords, and/or other classification data/information.

The applications 124 correspond to hosted applications that may access the data stored in the file system. Various applications 124 may, for example, have a web-based interface and may serve up network pages, such as web pages or other forms of network content, to facilitate user interaction. Other applications 124 may include internal applications that may not have a web-based interface. Non-limiting examples of applications 124 may include a photo organizing tool, a music file organizer and playback tool, a media reader, a word processor, a spreadsheet, an email application, and so on.

The data stored in the data store 115 includes, for example, account data 127, file systems 130, files 133, folders 136, account behavioral history 139, and potentially other data. The account data 127 includes various data associated with file service accounts including data regarding authorized users of the computing device 103. Such account data 127 may include, for example, usernames, passwords, security credentials, file management permissions, storage quotas and limitations, authorized applications, purchasing information, payment instrument information, billing information, and/or other data.

The file systems 130 correspond to logical file organizations that are maintained within the computing device 103 on behalf of one or more authorized users associated with a file service account. In various embodiments, the logical file organizations embodied in the file systems 130 are abstractions that do not directly correspond to any particular physical storage arrangements such as disk drives, portable storage media, etc. A file service account may be associated with one or more file systems 130. Each account-level user may have its own file system 130, or the file systems 130 may be shared by multiple account-level users.

Each file system 130 may include one or more files 133 and one or more folders 136. A file 133 may include a file name 142, a unique identifier 145, a data object reference 148, a parent object reference 151, one or more permissions 154, a file creation date, a file modification date, and/or other data. The file name 142 may correspond to a human-readable character string that identifies the contents of the file 133. In some embodiments, the file name 142 may be limited in character length and may be limited in terms of allowed characters. In some cases, such limitations may be enforced for compatibility reasons. In addition, the file name 142 may be restricted to being unique for a folder 136 and/or for a file system 130 in various embodiments.

The unique identifier 145 corresponds to a number, character string, or other identifier that uniquely identifies the file 133 across the file system 130 and/or all of the file systems 130. In one embodiment, a unique identifier 145 of a file 133 coupled with an identifier of a file system 130 may correspond to an identifier that is unique across all of the file systems 130. In another embodiment, the unique identifier 145 of a file 133 may itself be unique across all of the file systems 130.

The data object reference 148 corresponds to a reference that may identify a data object associated with the file 133 that is stored in a data store such as the data store 115 or another data store (e.g., data store 178). In one embodiment, the data object reference 148 may include a uniform resource identifier (URI). In another embodiment, the data object reference 148 may include a key value for obtaining the data object. The data store from which to obtain the data object may be determined implicitly or explicitly, for example, from a definition in the data object reference 148.

The parent object reference 151 corresponds to a reference that may identify a folder 136 or file 133 that is considered to be the parent of the file 133. In this way, folders 136 are associated with files 133. In some situations, the parent object reference 151 may include a special identifier (e.g., NULL, 0, etc.) that identifies the root folder 136 of the file system 130.

The permissions 154 may correspond to access permissions and security policies associated with the file 133. For example, a user may be designated as the file owner, and a group of users may be designated as a file group. In such an example, read or write access may be enabled or disabled as it applies to the user, the group of users, and/or all users. Similarly, access to a file 133 may be enabled or disabled as it applies to a file service account, a group of file service accounts, and/or all file service accounts. For the purposes of the permissions 154, an application 124 may be considered to be a user. The granularity of the permissions 154 may also vary among different embodiments. As a non-limiting example, a user or application 124 may be granted read access to a specific type of account behavioral history 139 associated with the file 133 but no other access to the file 133.

Each file 130 may also include characteristic information about the content of the file 130 including taxonomy information associated with the file 130 such as, but is not limited to, taxonomies, descriptions, product details, metadata, keywords, and/or other classification data/information, as well as other characteristic data/information describing the content of the file 130. For example, a music data file may include taxonomy information such as, but not limited to, genre of the music, artist(s) and/or group name(s), song and/or album title(s), writer and/or producer name(s), and other characteristic and/or relational information about the file content. The characteristic information may be stored as part of the file 130 and/or separately in the data store 115.

Each folder 136 may include, for example, a folder name 157, a unique identifier 160, a parent object reference 163, permissions 166, and/or other data. It is noted that, in some embodiments, a folder 136 may be implemented using the same data structure as a file 133. In other embodiments, a folder 136 may be implemented using a data structure that is different from the file 133.

The unique identifier 160 corresponds to a number, character string, or other identifier that uniquely identifies the folder 136 across the file system 130 and/or all of the file systems 130. In one embodiment, a unique identifier 160 of a folder 136 coupled with an identifier of a file system 130 may correspond to an identifier that is unique across all of the file systems 130. In another embodiment, the unique identifier 160 of a folder 136 may itself be unique across all of the file systems 130. In some embodiments, the unique identifier 160 may also be unique with respect to the unique identifiers 145 of the files 133.

The parent object reference 163 corresponds to a reference that may identify a folder 136 or file 133 that is considered to be the parent of the folder 136. In this way, folders 136 are associated with other folders 136. In some situations, the parent object reference 163 may include a special identifier (e.g., NULL, 0, etc.) that identifies the root folder 136 of the file system 130.

The permissions 166 may correspond to access permissions and security policies associated with the folder 136. For example, a user may be designated as the folder owner, and a group of users may be designated as a folder group. In such an example, read or write access may be enabled or disabled as it applies to the user, the group of users, and/or all users. Similarly, access to a folder 136 may be enabled or disabled as it applies to a file service account, a group of file service accounts, and/or all file service accounts. For the purposes of the permissions 166, an application 124 may be considered to be a user. In some embodiments, the permissions 166 may cascade down to any child folders 136 or child files 133 that are associated with the folder 136. In other embodiments, the permissions 166 of child folders 136 and the permissions 154 of child files 133 may override the permissions 166 of a parent folder 136.

Each folder 136 may also include characteristic information about the content of the folder 136 including taxonomy information associated with the folder 136 such as, but is not limited to, taxonomies, descriptions, product details, metadata, keywords, and/or other classification data/information, as well as other characteristic data/information describing the content of the folder 136 and/or the content of child folders 136 or child files 133. For example, a folder including video data files may include taxonomy information such as, but not limited to, genre of the videos, actor name(s), title(s), writer and/or producer name(s), name of a corresponding video series, and other characteristic and/or relational information about the file content. The characteristic information may be stored as part of the folder 136 and/or separately in the data store 115.

The account behavioral history 139 corresponds to information that is associated with the files 133 and/or folders 136 of a file service account. Account behavioral history 139 may include information about, for example, file and/or folder access 169, file and/or folder manipulation 172, file acquisition 175, and/or other information. The file and/or folder access 169 can include information corresponding to accessing a file 133 or folder 136 by a user associated with a file service account such as, e.g., the time, frequency, and/or behavioral patterns of accessing or browsing the file 133 and/or folder 136. The file 133 and/or folder 136 may be included in the file system 130, provided for sampling by the file service 118 or another source, or globally accessible through the file service 118. The file and/or folder manipulation 172 can include information identifying changes to a file 133 or folder 136 such as, e.g., time of download to a client 109 and movement of files 133 between folders 136. The file acquisition 175 can include information corresponding to acquisition of files such as past purchases or uploads of data files. The file acquisition 175 can include information corresponding to the time of purchase or the source of a file 133 associated with a file service account. As non-limiting examples, the file acquisition 175 may correspond to information associated with the acquisition of image data files, audio data files, video data files, and/or other types of data files.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations.

For purposes of convenience, the computing device 106 is referred to herein in the singular. Even though the computing device 106 is referred to in the singular, it is understood that a plurality of computing devices 106 may be employed in the various arrangements as described above. Further, though the computing device 106 is described separately from the computing device 103, it is understood that the applications and data described in connection with the computing device 106 may be provided in the computing device 103 in some embodiments. In some cases, one or more of the computing devices 106 may be operated by an entity that is different from the entity that operates the computing devices 103.

Various applications and/or other functionality may be executed in the computing device 106 according to various embodiments. Also, various data is stored in a data store 178 that is accessible to the computing device 106. The data store 178 may be representative of a plurality of data stores 178 as can be appreciated. In one embodiment, the data store 178 may correspond to a cloud storage resource where data storage is provided according to a utility computing model. In one embodiment, the data store 178 may provide eventually consistent storage. The data stored in the data store 178, for example, is associated with the operation of the various applications and/or functional entities described below.

The components executed on the computing device 106, for example, include a data storage service 181 and other applications, services, processes, systems, engines, or functionality not discussed in detail herein. The data storage service 181 is executed to provide access to store and retrieve data from the data stores 178. The data storage service 181 may store and retrieve data based upon a unique identifier such as a key, which may be a character string, number, or other identifier. The data storage service 181 may function to abstract the underlying storage layer so that users of the data storage service 181 have no knowledge as to how their data is actually being stored. For example, users may not know on what disk drives, in what computing device 106, in what data center, etc. that their data is being stored. In various embodiments, a user may be able to specify performance characteristics or types of hardware to be used in storing the data.

The data stored in the data store 178 includes, for example, data objects 184 and potentially other data. The data objects 184 correspond to the data stored for the files 133. Such data may be any type of data object, such as, for example, text data, binary data, multimedia data, and so on.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include, for example, one or more display devices 193 such as cathode ray tubes (CRTs), liquid crystal display (LCD) screens, gas plasma-based flat panel displays, LCD projectors, or other types of display devices, etc. The client 109 may also include, for example various peripheral devices. In particular, the peripheral devices may include input devices such as, for example, a keyboard, keypad, touch pad, touch screen, microphone, scanner, mouse, joystick, or one or more push buttons, etc.

The client 109 may be configured to execute various applications such as a browser application 187 and/or other client applications 190. The browser application 187 renders network pages provided by the computing device 103 that facilitate interaction with the file service 118, the recommendations service 121, and/or other applications 124. The browser application 187 and/or client applications 190 may be executed to store, retrieve, process, and otherwise use files 133 and folders 136 in one or more file systems 130 in the computing device 103. The browser application 187 is configured to interact with the file service 118, recommendations service 121, and potentially other applications 124 on the computing device 103 according to an appropriate protocol such as the Internet Protocol Suite comprising Transmission Control Protocol/Internet Protocol (TCP/IP) or other protocols. To this end, the browser application 187 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 187 may comprise some other application with like capability.

When executed in the client 109, the browser application 187 renders network pages 196 on the display device 193. Network pages 196 indicating content (e.g., files 133 and/or folders 136) of a file system 130 can include one or more merchandizing recommendation(s) 199 for items to the user. In one embodiment, the browser application 187 is integrated with an operating system of the client 109 to provide access to a file system 130 similarly to any mounted file system of the client 109. The client 109 may be configured to execute client applications beyond browser application 187 such as, for example, email applications, instant message applications, and/or other applications.

Next, a general description of the operation of the various components of the networked environment 100 is provided. To begin, a user may establish a file service account through the browser application 187, a client application 190, or another application 124 to create one or more file systems 130. Where the user is described as performing an action, it is understood that the user may be interacting with at least the browser application 187 and/or a client application 190 to perform the action. The file service 118 and/or one or more application(s) 124 of the computing device 103 may provide a user interface to allow the user to create the file service account by generating one or more network page(s) 196 in response to user actions. The user may specify various parameters, such as, for example, a maximum storage requirement, performance requirements, a rate plan, access permissions, security credentials, and so on. The user may also provide purchasing and/or billing information and/or existing purchasing and/or billing information may be correlated with the user. Accordingly, the account data 127 corresponding to the established file service account is populated and a file system 130 may be created.

Figure 2:
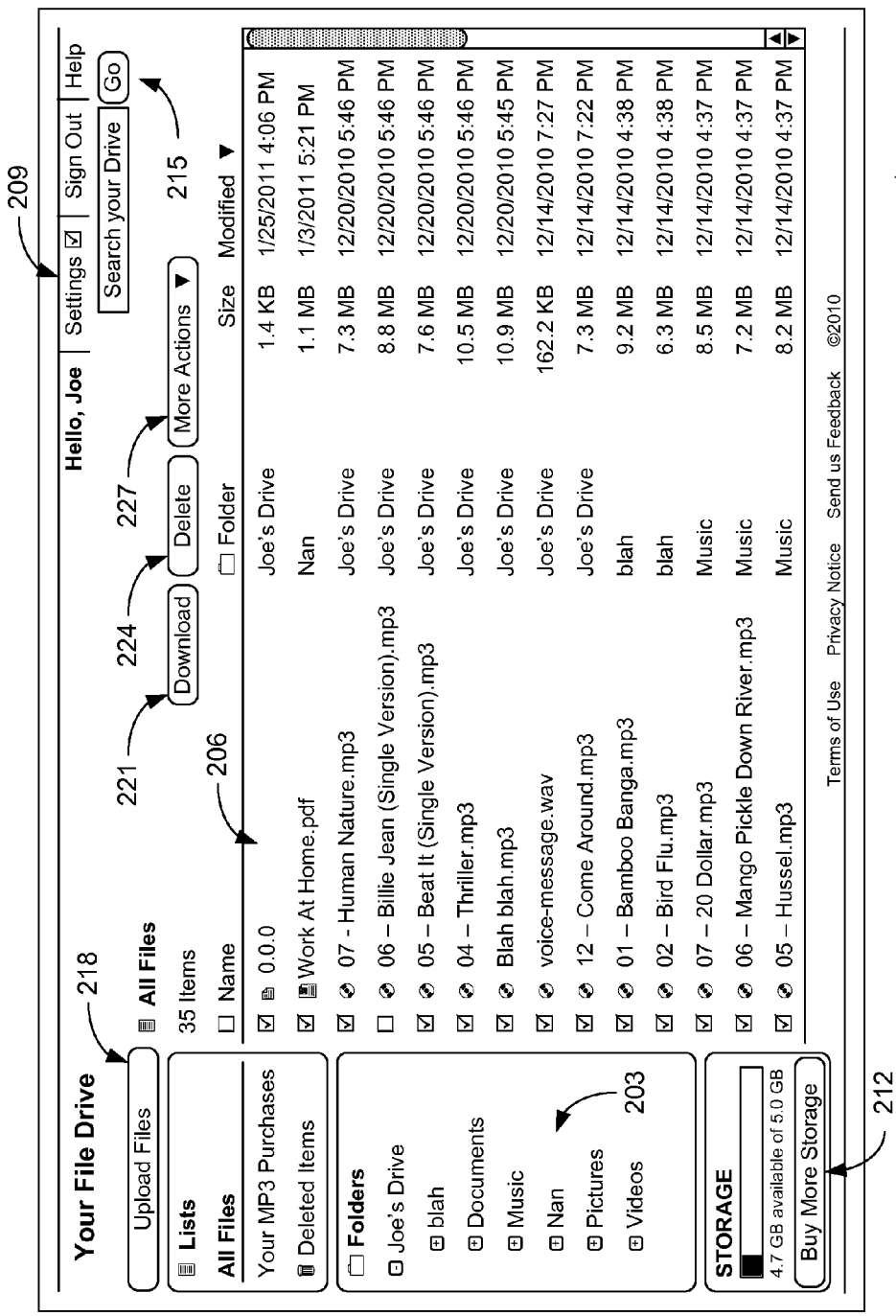
FIG. 2 is a graphical representation illustrating an example of a network page generated in a computing device and rendered by a client in the networked environment of FIG. 1 according to various embodiments of the present disclosure.

The file service 118 and/or the application(s) 124 may also provide a user interface to allow the user to access and/or manipulate content of the file system(s) 130 associated with the established account. For example, based at least in part upon data from the file service 118, the application(s) 124 may generate one or more network page(s) 196 that facilitate interaction with the file service 118, the recommendations service 121, and/or the applications 124. In other implementations, the file service 118 may generate the network page 196. Referring to FIG. 2, shown is an example of a network page 196a facilitating access to a file system 130 (FIG. 1). In the non-limiting implementation of FIG. 2, the network page 196a includes a representation 203 of the organization of the file system 130 and a view 206 of information corresponding to files 133 (FIG. 1) and/or folders 136 (FIG. 1) in the file system 130. The network page 196a also includes one or more link(s), embodied in the form of hypertext, a "select" button or icon, or other component as can be appreciated that, when selected, may initiate actions by the file service 118 (FIG. 1) and/or the application(s) 124 (FIG. 1). For example, a settings link 209 may initiate generation and rendering of another network page 196 that allows for configuration of the file service account settings. Icon 212 may initiate generation and rendering of another network page 196 for adding additional storage capacity to the file service account. The network page 196a may also include links that allow for searching 215 or manipulation of files 133 in the file system 130 such as, but not limited to, uploading 218 a file 133 to the file system 130, downloading 221 a data file from the file system 130, deleting files 224, and other selectable actions 227.

Referring back to FIG. 1, the user may transfer files to the file system 130 by way of the applications 124 or the browser application 187 and/or client applications 190. Such a transfer may involve the user uploading a data file from the client 109 to the computing device 103 and/or the computing device 106. In other cases, a user may purchase a data file (e.g., a music data file, a video data file, or a text data file) from an online retailer associated with the computing device 103, and the data file may be automatically uploaded and saved to the file system 130 by way of an application 124 or the file service 118.

When a data file is transferred to the file system 130, a file 133 is created in the file system 130 by the file service 118. The file name 142 may correspond to the original file name associated with the source file, or the file name 142 may be explicitly specified by the user or an application 124. The unique identifier 145 is generated for the file 133. A data object 184 corresponding to the data associated with the source file is stored in the data store 178 by the file service 118 interacting with the data storage service 181. A data object reference 148 corresponding to the stored data object 184 is then recorded for the file 133.

The permissions 154 may be explicitly specified by the user or application 124, or the permissions 154 may be inherited according to defaults or parent permissions 154. A parent object reference 151 may optionally be specified for the file 133. If no parent object reference 151 is specified, the file 133 may be considered to be in the root folder 136 for the file system 130.

Folders 136 may also be created or imported by users and/or applications 124. The folder name 157 may correspond to the original name associated with a source folder, or the folder name 157 may be explicitly specified by the user or the application 124. The unique identifier 160 is generated for the folder 136. The permissions 166 may be explicitly specified by the user or application 124, or the permissions 166 may be inherited according to defaults or parent permissions 166. A parent object reference 163 may optionally be specified for the folder 136. If no parent object reference 163 is specified, the folder 136 may be considered to be in the root folder 136 for the file system 130.

It is noted that the various data associated with the files 133, the folders 136, or the file systems 130 need not be recorded in inodes, vnodes, file allocation tables, or any other data structure associated with physical file systems. In various embodiments, the data associated with the files 133, the folders 136, and the file systems 130 may be maintained as data within a relational database management system (RDBMS) or similar database management systems.

After a file 133 or folder 136 is created, or in conjunction with the creation of a file 133 or folder 136, account behavioral history 139 may be updated by the file service 118 and accessed through the recommendations service 121. Account behavioral history 139 may include information about file and/or folder access 169 such as, but not limited to, time and frequency of access. The account behavioral history 139 may also include information about file and/or folder manipulation 172 such as, but not limited to, renaming, deleting, downloading, and moving files and/or folders. In this way, the account behavioral history 139 is associated with a file 133 or folder 136. The account behavioral history 139 may also include information about file acquisition 175 through the file service 118. The file acquisition 175 can include information regarding a file 133 associated with data that is currently stored or was previously stored as a data object 184 in the data store 178 by the file service 118 interacting with the data storage service 181. In one embodiment, one or more applications 124 may be configured to automatically create or amend a set of account behavioral history 139 for a file 133 when the file 133 is created, stored, accessed, and/or modified.

As a non-limiting example, a user may have a file system 130 on which the user maintains files 133 that are music files. An application 124 may be used to playback and/or organize the music files. The application 124 may be configured to process the music files when the user adds (or removes) the music files to (or from) the file system 130 or at another time. Consequently, the application 124 or another application 124 may provide a user interface to allow the user to search the music files by title, artist, album, etc.

The file service 118 may support various operations related to files 133 and folders 136 such as, for example, renaming, copying, moving, deleting, recycling, uploading, downloading, and so on. When a file 133 or folder 136 is renamed, the file name 142 or folder name 157 is updated, but no change occurs to the data object 184. When a file 133 or folder 136 is copied, a duplicate file 133 or folder 136 (and contents) may be created to point to the same data object(s) 184. The data object 184 itself may be duplicated when necessary according to copy-on-write or another methodology. The account behavioral history 139 is also updated by the file service 118 to indicate the changes to the file 133 and/or folder 136.

When a file 133 or folder 136 is moved, the parent object reference 151 or 163 may be updated, without any changes to the underlying data object(s) 184. When a file 133 or folder 136 is deleted, data object(s) 184 may be removed if no other files 133 point to the data object(s) 184. In some cases, uploading and downloading functionality may involve the browser application 187 and/or client application 190 interfacing directly with the data storage service 181. The implementations of the operations described above limit modifications to the data objects 184 in the data store(s) 178, which may be expensive in terms of time or cost.

The file service 118 may support various operations relating to the account behavioral history 139. Non-limiting examples of such operations may include adding data to the account behavioral history 139, deleting data from the account behavioral history 139, obtaining account behavioral history 139, searching for account behavioral history 139, and/or other operations. In addition, the account behavioral history 139 is maintained consistently in association with the corresponding files 133 or folders 136. For example, when the file name 142 of a file 133 changes, the corresponding account behavioral history 139 remains linked to the file 133. When a file 133 or folder 136 is copied, the corresponding account behavioral history 139 may be located and copied by the file service 118. When a file 133 or folder 136 is deleted, the corresponding account behavioral history 139 may be located and deleted by the file service 118 as well.

As discussed above, the browser application 187 executed in client 109 renders network pages 196 provided by the computing device 103 (e.g., network page 196a of FIG. 2) that facilitate access to the content of the file system 130. The network page 196 may also include one or more merchandising recommendations 199 based at least in part upon the account behavioral history 139 and/or file system content included in the network page 196.

Figure 3:
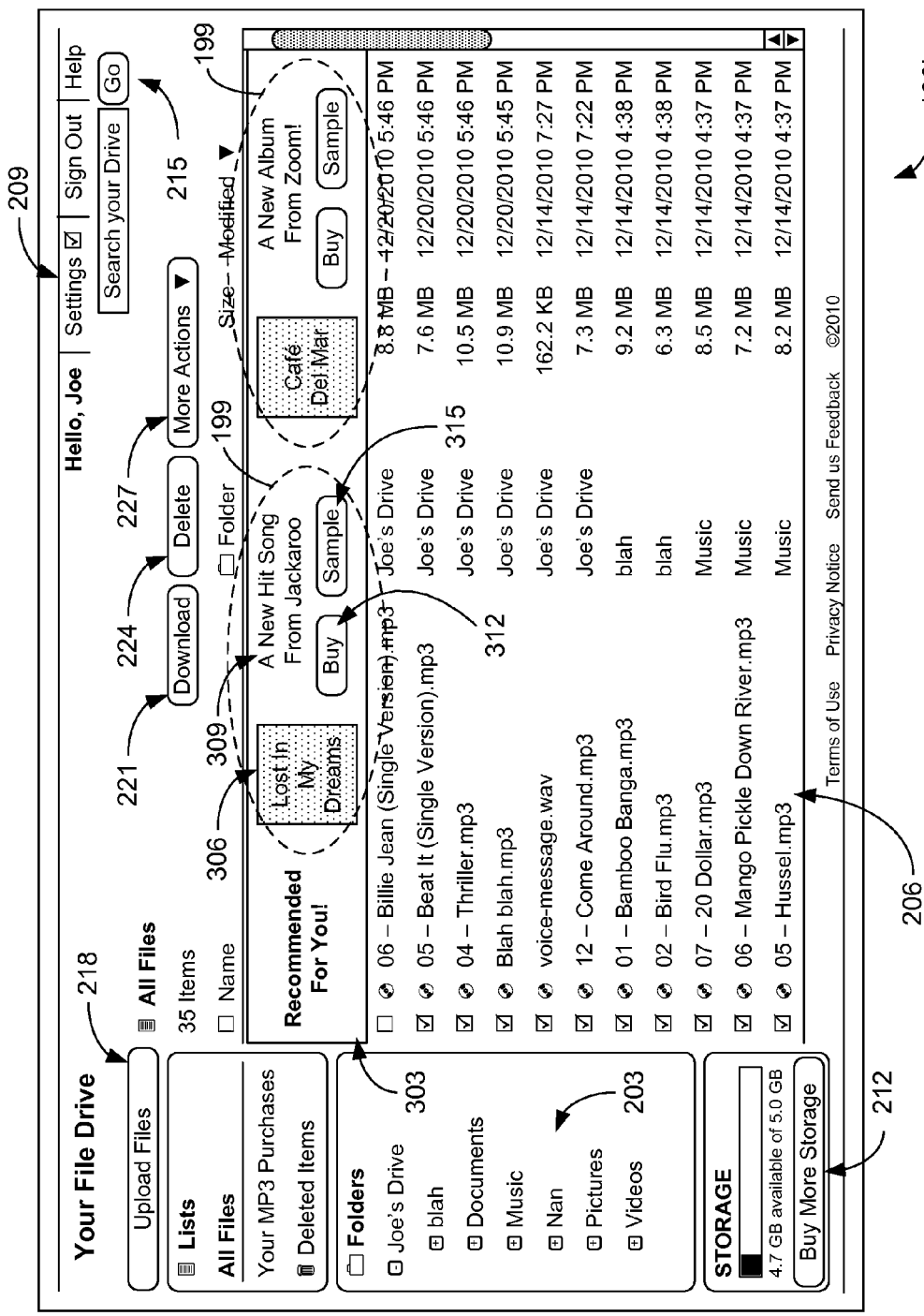
FIGS. 3-6 are graphical representations illustrating examples of network pages including merchandising recommendations that are generated in a computing device and rendered by a client in the networked environment of FIG. 1 according to various embodiments of the present disclosure.

Referring to FIG. 3, shown is an example of a network page 196b including merchandising recommendations 199. Included in the view 206 of information corresponding to files 133 (FIG. 1) and/or folders 136 (FIG. 1) in the file system 130 is a recommendations banner 303 that includes one or more merchandising recommendation(s) 199. The merchandising recommendations 199 may be recommendations for individual files (e.g., songs, pictures, videos, books, etc.), a group of related files (e.g., an album of songs, series of television shows or books, etc.), or combinations thereof based at least in part upon file system content included in the network page 196.

Merchandising recommendations 199 are provided by the recommendations service 121 based at least in part upon the content of the file system 130 accessed through a network page 196. To this end, the recommendations service 121 may use various algorithms to determine items for recommendation in merchandising recommendations 199. For example, the recommendations service 121 may generate merchandising recommendation(s) 199 by correlating at least a portion of the characteristic information (e.g., the taxonomy information) associated with the accessed files 133 and/or folders 136 with at least a portion of the characteristic information (e.g., the taxonomy information) associated with items in the recommendations catalog and selecting an item for recommendation by a merchandising recommendation 199 based upon the correlation.

In one implementation, the recommendations service 121 determines one or more scores corresponding to the correlation between an item in the recommendations catalog and the content of the file system 130 or the file system content that is requested by the client 109. Recommendations may be determined based upon comparison of the correlation score(s) to a predefined threshold or by selecting one or more recommendation(s) having the highest scores. The recommendations service 121 may be configured to find other affiliations or affinities between various products in order to generate a merchandising recommendation 199. The merchandising recommendations 199 provided by the recommendations service 121 may recommend items that are available through file service 118 or from other providers through the network 112 (FIG. 1).

The recommendations service 121 may also provide the merchandising recommendation(s) 199 based at least in part upon the account behavioral history 139. For example, the recommendations service 121 may generate a merchandising recommendation 199 based upon a pattern of file 133 and/or folder 136 access, manipulation, and acquisition. In one implementation, the recommendations service 121 may identify a pattern of accessing (or browsing) a specific genre of music data file and provide one or more merchandising recommendation(s) 199 for other music data files that are in the same genre but are not included in the file system 130. The recommendations service 121 may also provide the merchandising recommendation(s) 199 based upon a combination of accessed content and account behavioral history 139.

In the non-limiting example of FIG. 3, two merchandising recommendations 199 are provided in the recommendations banner 303. In other examples, one or more merchandising recommendation(s) 199 may be provided at other positions in the network page 196b. For example, in the view 206, a recommendation banner 303 including merchandising recommendation(s) 199 may be located between groupings of listed files or at the bottom of the view 206 of a network page 196. Merchandising recommendation(s) 199 may also be provided in the header and/or in side bars of the network page 196b.

The merchandising recommendation 199 includes information about the recommended item such as, but not limited to, an image 306 of the item, the title or other identifier, and other descriptive information 309 about the item. The merchandising recommendation 199 may also include links to allow purchasing the recommended item from the network page 196b. In the example of FIG. 3, icon 312 may be selected to initiate purchase of the recommended item associated with the icon 312. In one implementation, selecting icon 312 initiates the generation and rendering of another network page 196 to facilitate the collection of purchasing information from the user. Upon satisfactory completion of the purchasing process, the purchased data file(s) may be automatically saved to the file system 130 (FIG. 1) by way of an application 124 (FIG. 1) or the file service 118 (FIG. 1), may be transferred to the file system 130 by the user, or may be downloaded to the client 109 (FIG. 1). In other implementations, the account data 127 (FIG. 1) may include the user's purchasing information. Selection of icon 312 causes an application 124 and/or the file service 118 to automatically purchase the recommended item, based upon the account data 127, and save the purchased data file(s) to the file system 130. The file service 118 can update the account behavioral history 139 to include information regarding the recommended item accordingly. In this way, purchasing feedback may be provided to the recommendations service 121 for use in providing further merchandising recommendations.

A merchandising recommendation 199 may also include links to allow a user to preview or sample at least a portion of the recommended item from the network page 196b. Selecting the link may allow the user to preview the recommended item for a predefined number of times or for a predefined period of time. For example, selecting icon 315 in FIG. 3 may initiate a preview (e.g., playing) of the recommended song one or more times. Other embodiments may allow the user to preview (e.g., display or view) a section of a book or a portion of a video. File service 118 allows access to at least a portion of the recommended item, which may be stored as a data object 184 in data store 178, and updates the account behavioral history 139 accordingly. The account behavioral history 139 that tracks access by the user to the recommended item may be used by the recommendations service 121 to provide merchandising recommendations for other items to the user. In other implementations, the sample may be provided by another computing device through an application(s) 124 or the file service 118. The file service 118 can update the account behavioral history 139 to include information regarding the recommended item accordingly. In this way, previewing feedback may be provided to the recommendations service 121 for use in providing further merchandising recommendations.

Figure 4:
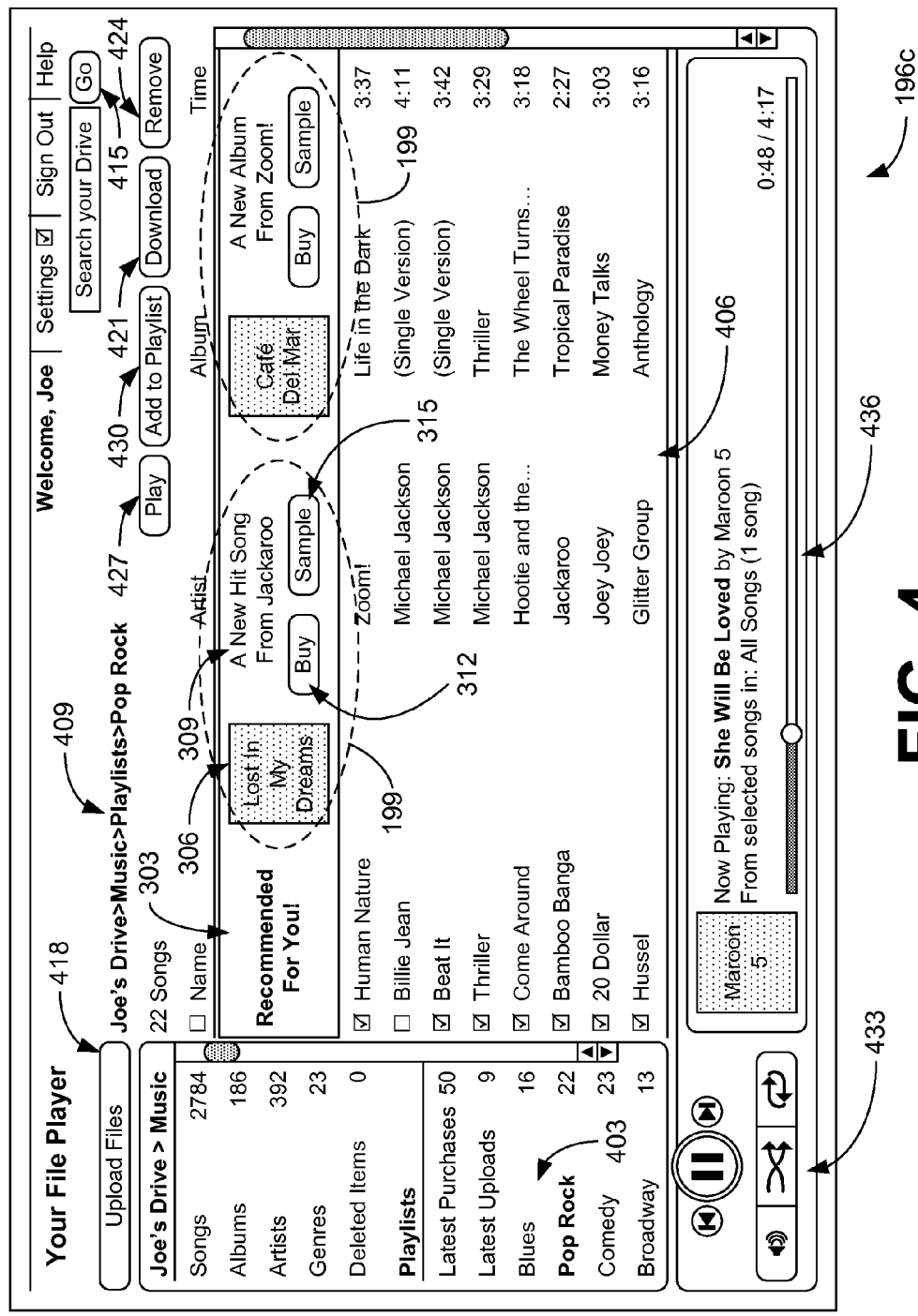

The applications 124 may also correspond to hosted applications that may access the data stored in the file system. Various applications 124 may, for example, have a web-based interface and may serve up network pages, such as web pages or other forms of network content, to facilitate user interaction. For example, applications 124 may include a photo organizing tool, a music file organizer and playback tool, a word processor, a spreadsheet, an email application, and so on. With reference to FIG. 4, shown is an example of a network page 196c providing an audio playback tool (or file player) including merchandising recommendations 199. Other applications that may be provided through a network page 196 include, but are not limited to, a video playback tool, a media reader, and a word processor.

In the non-limiting embodiment of FIG. 4, the network page 196c includes a representation 403 of the organization of a portion of the file system 130 and a view 406 of information corresponding to files 133 (FIG. 1) and/or folders 136 (FIG. 1) in a selected portion of the file system 130. The logical organization 409 of the selected portion may be provided in the network page 196c. The network page 196c also includes links that, when selected, may initiate actions by the file service 118 (FIG. 1) and/or the application(s) 124 (FIG. 1). For example, the network page 196c may also allow for searching 415 or manipulation of files in the file system 130 such as, but not limited to, uploading 418 a data file to the file system 130, downloading 421a data file from the file system 130, removing files 424, playing 427 a file, adding 430 a file to a playlist, and other selectable actions. The network page 196c of FIG. 4 also includes icons 433 representing playback controls and a graphical display 436 providing information about the file being played.

Included in the view 406 of information corresponding to files 133 in the file system 130 is a recommendations banner 303 that includes one or more merchandising recommendation(s) 199. In the non-limiting example of FIG. 4, two merchandising recommendations 199 are provided in the recommendations banner 303. In other examples, one or more merchandising recommendation(s) 199 may be provided at other positions in the network page 196c. For example, a recommendation banner 303 including merchandising recommendation(s) 199 may be located at other positions in the view 406. Merchandising recommendation(s) 199 may also be provided in the header or in side bars of the network page 196c. The merchandising recommendation 199 includes information about the recommended item such as, but not limited to, an image 306 of the item, the title or other identifier, and other descriptive information 309 about the item. The merchandising recommendation 199 also includes an icon 312 to allow purchasing the recommended item from the network page 196c and an icon 315 to allow a user to preview or sample the recommended item from the network page 196c as discussed above.

Figure 5:
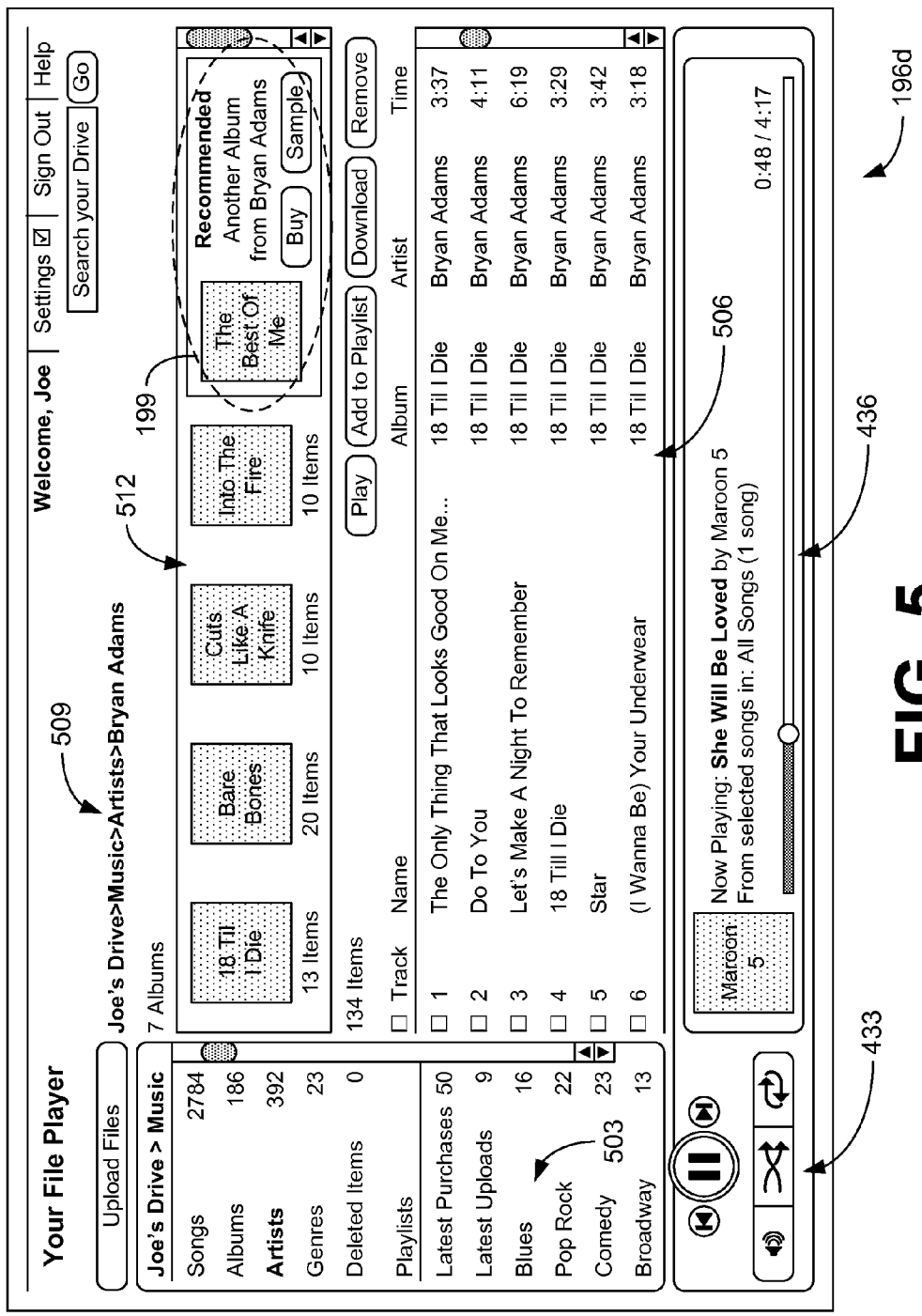

Referring now to FIG. 5, shown is another example of a network page 196d providing an audio playback tool (or file player) including a merchandising recommendation 199. In the non-limiting embodiment of FIG. 5, the network page displays albums in the file system 130 that are associated with a specified artist. The network page 196d includes a representation 503 of the organization of a portion of the file system 130 and a view 506 of information corresponding to files 133 (FIG. 1) in a selected portion of the file system 130. The logical organization 509 of the selected portion may be provided in the network page 196d. The network page 196d also includes links such as icons that, when selected, may initiate actions by the file service 118 (FIG. 1) and/or the application(s) 124 (FIG. 1). For example, as in the example of FIG. 4, the network page 196d may allow for searching or manipulation of files 133 in the file system 130 such as, but not limited to, uploading a data file to the file system 130, downloading a data file from the file system 130, removing files, playing a file, adding a file to a playlist, and other selectable actions. The network page 196d of FIG. 5 also includes icons 433 representing playback controls and a graphical display 436 providing information about the file being played.

In the example of FIG. 5, the network page 196d includes a view 512 displaying albums associated with songs displayed in view 506 and a merchandising recommendation 199. The merchandising recommendation 199 is based at least in part upon file system content included in the network page 196. For example, the recommended item may be another album by the selected artist that is not included in the file system 130. The merchandising recommendation 199 includes information about the recommended item such as, but not limited to, an image of the item, the title or other identifier, and other descriptive information about the item. The merchandising recommendation 199 also includes a link to allow purchasing the recommended item from the network page 196d and a link to allow a user to preview or sample at least a portion of the recommended item from the network page 196d as discussed above.

Figure 6:
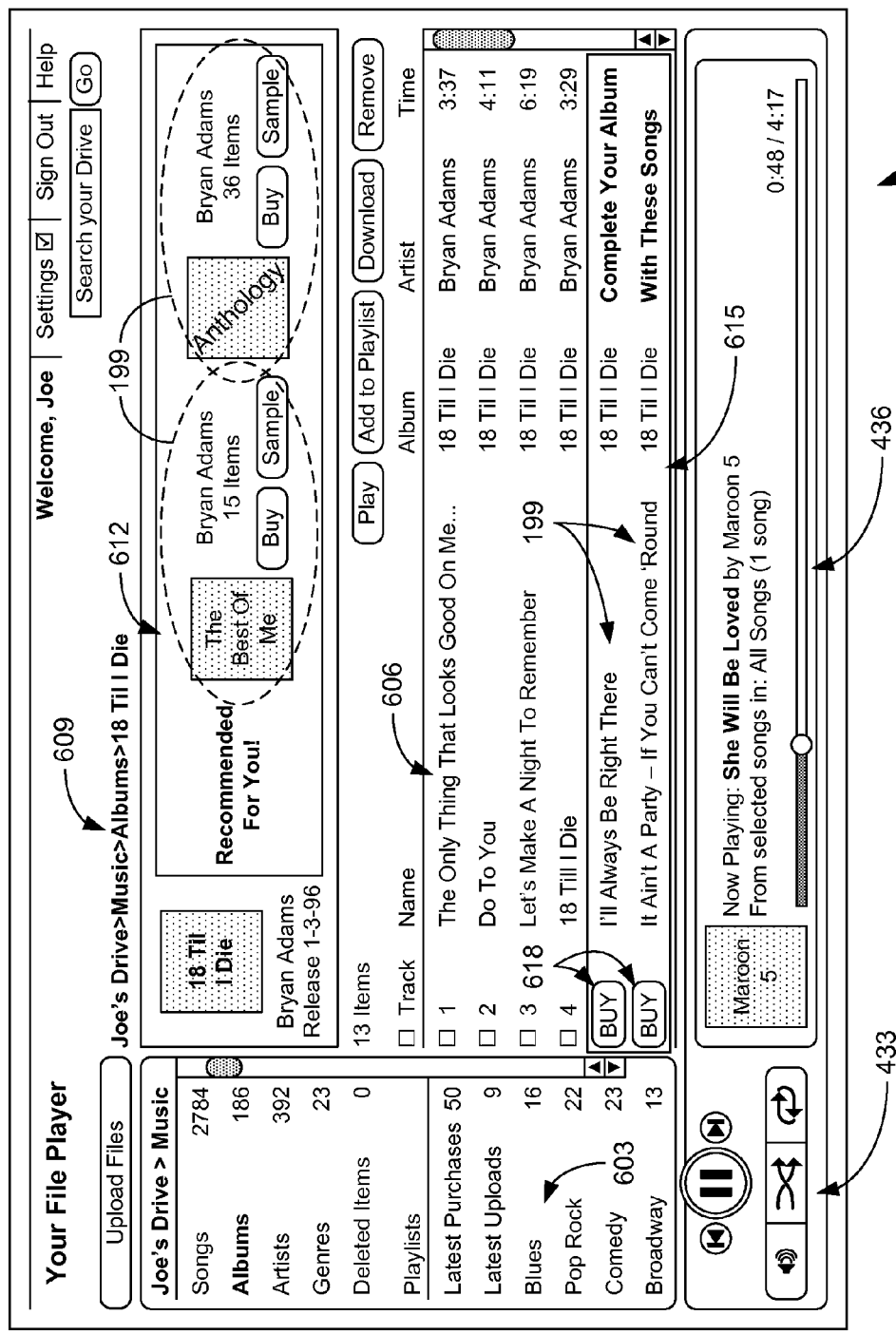

Referring next to FIG. 6, shown is another example of a network page 196e providing an audio playback tool (or file player) including merchandising recommendations 199. In the non-limiting embodiment of FIG. 6, the network page displays songs in the file system 130 (FIG. 1) that are associated with a specified album. The network page 196e includes a representation 603 of the organization of a portion of the file system 130 and a view 606 of information corresponding to files 133 (FIG. 1) in a selected portion of the file system 130. The logical organization 609 of the selected portion may be provided in the network page 196e. The network page 196e also includes links such as icons that, when selected, may initiate actions by the file service 118 (FIG. 1) and/or the application(s) 124 (FIG. 1). For example, as in the examples of FIGS. 4 and 5, the network page 196e may allow for searching or manipulation of files 133 in the file system 130 such as, but not limited to, uploading a data file to the file system 130, downloading a data file from the file system 130, removing files, playing a file, adding a file to a playlist, and other selectable actions. The network page 196e of FIG. 6 also includes icons 433 representing playback controls and a graphical display 436 providing information about the file being played.

Included above the view 606 of information corresponding to files 133 in the file system 130 is a recommendations banner 612 that includes one or more merchandising recommendation(s) 199. The merchandising recommendations 199 may be recommendations for individual files, a group of related files, or combinations thereof based at least in part upon file system content included in the network page 196e. In the non-limiting example of FIG. 6, two merchandising recommendations 199 are provided in the recommendations banner 612 for albums associated with the artist of the selected album. In other examples, merchandising recommendations 199 may be provided for other items associated with the network page content. The merchandising recommendations 199 include information about the recommended item such as, but not limited to, an image of the item, the title or other identifier, and other descriptive information about the item. The merchandising recommendations 199 also include a link to allow purchasing the recommended item from the network page 196e and a link to allow a user to preview or sample at least a portion of the recommended item from the network page 196e as discussed above.

In addition, the network page 196e includes another recommendations banner 615 at the bottom of the view 606, which may include one or more additional merchandising recommendation(s) 199. In the example of FIG. 6, the banner 615 includes two merchandising recommendations 199 for songs from the selected album that are not included in the file system 130. The merchandising recommendations 199 in the banner 615 include the title of the missing files and an icon 618 to allow purchasing the recommended item (song) from the network page 196e. An icon for sampling the recommended item is not included in the embodiment of FIG. 6.

While the examples of FIGS. 4-6 refer to an audio playback tool, the examples of merchandising recommendations 199 may also be applied to other network page applications such as, but not limited to, a video playback tool, a media reader, a word processor, etc. The merchandising recommendations 199 may also be included in other network pages 196 that are generated for accessing content in the file system 130.

Figure 7:
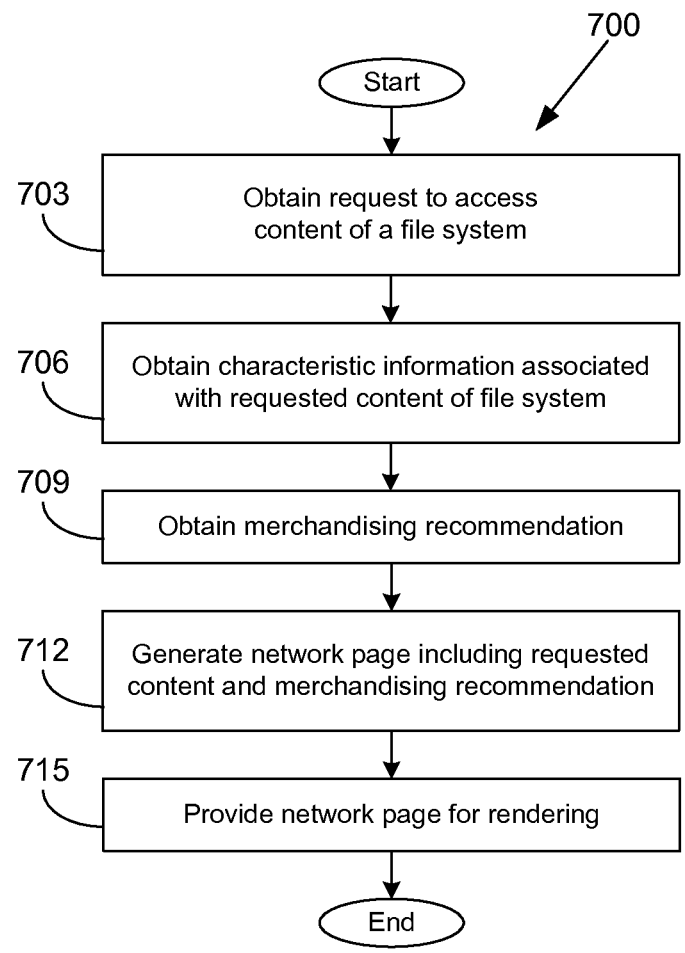
FIGS. 7-9 are flowcharts illustrating examples of functionality implemented as portions of a file service and/or a recommendations service executed in a computing device in the networked environment of FIG. 1 according to various embodiments of the present disclosure.
Figure 8:
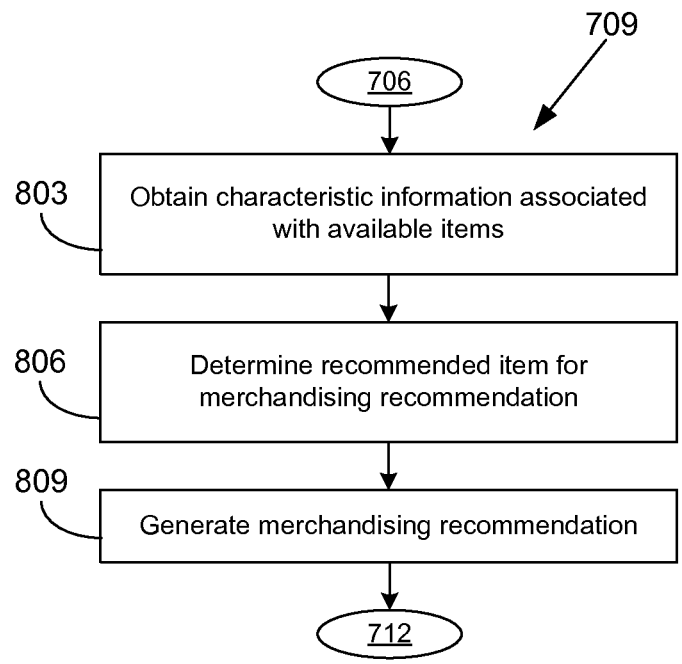
Figure 9:
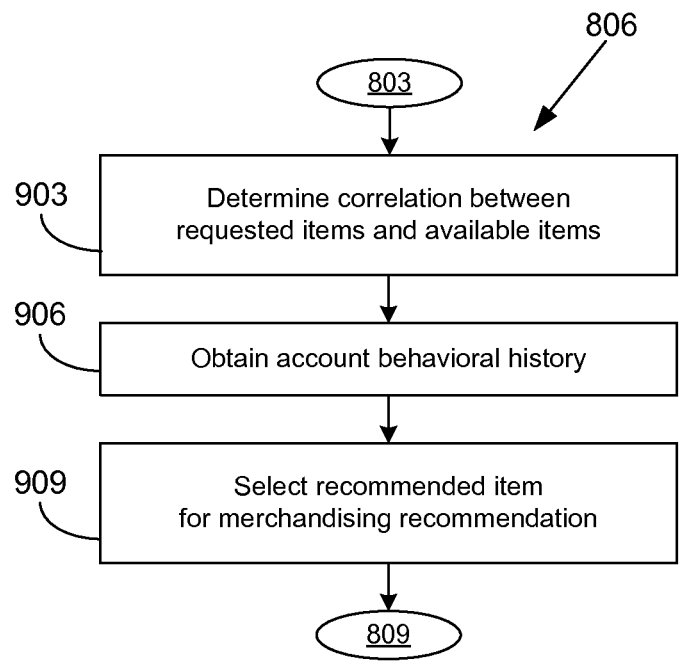

Referring next to FIGS. 7-9, shown are flowcharts illustrating examples of functionality implemented as portions of a file service 118 (FIG. 1) and/or a recommendations service 121 (FIG. 1) according to various embodiments of the present disclosure. It is understood that the flowcharts of FIGS. 7-9 provide merely examples of the many different types of functional arrangements that may be employed to implement the operation of the portion of the file service 118 and/or recommendations service 121 as described herein. As an alternative, the flowcharts of FIGS. 7-9 may be viewed as depicting examples of steps of a method implemented in the computing device 103 (FIG. 1) according to one or more embodiments.

Beginning with block 703 of flowchart 700 in FIG. 7, a request to access content of a file system 130 (FIG. 1) associated with a file service account is obtained. For example, a user of a client 109 (FIG. 1) may request to access some or all files 133 (FIG. 1) associated with a file service account. The files 133 may be included in one or more files system(s) associated with the file service account. Other examples of requests include, but are not limited to, logging into the file service account, which automatically initiates the generation of a predefined network page 196 including at least a portion of the content of a file system 130 associated with the file service account, opening a folder 136 (FIG. 1) of the file system 130 to display the content of the folder 136, searching the content of one or more file system(s) 130, which results in generation of a network page 196 (FIG. 1) to provide the search results, or other operations as can be appreciated.

In response to obtaining a request to access content of the file system, characteristic information associated with the requested content (e.g., files 133 and/or folders 136) is obtained in block 706. In some implementations, characteristic information may also be obtained for files 133 and folders 136 associated with the requested content. Characteristic information includes taxonomy information and/or other characteristic data/information describing the content of the file system(s) 130.

A merchandising recommendation 199 (FIG. 1) is obtained in block 709 based at least in part upon the characteristic information associated with the requested content of the file system(s) 130. For example, an item may be selected from a listing or catalog of items that are available for purchasing through the file service 118 and/or from an online retailer. The selection may be based upon a correlation between the characteristic information associated with the requested content and characteristic information associated with the available items. In some embodiments, correlation scores are determined for the available items and compared to a predefined threshold to select one or more item(s) for recommendation. The number of available items for recommendation may initially be reduced based upon the user interface or other inputs such as search words from the user before correlating the characteristic information. In some embodiments, the file service 118 includes one or more predefined merchandising recommendation(s) 199 that may be selected for inclusion in the network page 196.

With reference to FIG. 8, shown is a flowchart illustrating one example of obtaining a merchandising recommendation 199 in block 709 of FIG. 7. After characteristic information associated with the requested content is obtained in block 706, characteristic information associated with at least a portion of the available items is obtained in block 803. As noted above, the number of available items for recommendation may initially be reduced or prefiltered to reduce processing time and cost. The characteristic information includes taxonomy information and/or other characteristic data/information describing the available files.

The recommended item for the merchandising recommendation 199 is determined in block 806 based at least in part upon the characteristic information associated with the requested content and characteristic information associated with the available items. In some embodiments, the characteristic information includes metadata, keywords, and/or taxonomy information to determine a relationship between the requested content and the available items. Comparison of the characteristic information may be used to determine a relationship between the requested content and an available item. For example, metadata that is common to both an available item and the requested content may be used as an indication that the available item should be recommended. In other implementations, more extensive correlations may be carried out to determine an association of an available item with the requested content of the file system 130.

Referring now to FIG. 9, shown is a flowchart illustrating one example of the determination of a recommended item in block 806 of FIG. 8. After obtaining the characteristic information associated with the available items in block 803, a correlation between the requested items and the available items is determined based at least in part upon the characteristic information. Various algorithms may be utilized to determine a correlation (or a correlation value) between the available items and the requested content of the file system 130 (FIG. 1). Correlations with other content of the file system 130 that is related to the requested content may also be used as part of the determination of the recommended item.

Account behavioral history 139 (FIG. 1) is obtained in block 906 and a recommended item for the merchandising recommendation 199 (FIG. 1) is selected in block 909. Selection of an available item is based at least in part upon the correlation between the characteristic information associated with the requested content and characteristic information associated with the available items that was determined in block 903. Selection of an available item for the merchandising recommendation may also be based at least in part upon account behavioral history 139 (FIG. 1) associated with the file system account. The account behavioral history 139 includes or may be used to determine behavioral patterns for accessing, manipulating, and/or acquiring content of the file system 130. Behavioral patterns may include, e.g., access patterns such as, but not limited to, viewing movies having a common actor or listening to music preformed by the same group; manipulation patterns such as, but not limited to, organizing files 133 within folders 136 or deleting books for a certain age group; and acquisition patterns such as, but not limited to, purchasing of music with a common genre or books included in a series or by the same author. Other behavioral patterns may also be determined, based upon the monitored behavior of users of the file service account or a common characteristic, as can be understood. In some cases, the account behavioral history 139 may include patterns (or rules) that may be defined by the recommendations service 121 (FIG. 1) based upon behavioral history or by a user of the file service account.

Returning to block 809 of FIG. 8, a merchandising recommendation 199 (FIG. 1) is generated to recommend the selected item in a network page 196 (FIG. 1). The merchandising recommendation 199 includes information about the recommended item such as, e.g., an image of the item, the title, and other descriptive information. The merchandising recommendation 199 may also include one or more link(s) to allow purchasing and/or previewing the recommended item from the network page 196. Link(s) may also be provided in the merchandising recommendation 199 to provide additional information about the item or to direct the user of the file service account to an online retailer that is not available through the file service 118 (FIG. 1).

Returning to block 712 of FIG. 7, after obtaining the merchandising recommendation 199 (FIG. 1), a network page 196 (FIG. 1) (FIG. 1) is generated. The network page 196 includes at least a portion of the requested content of the file system 130 (FIG. 1) and one or more merchandising recommendation(s) 199. The merchandising recommendation(s) 199 may be located at various positions within the network page 196. In some implementations, a merchandising recommendation 199 is positioned adjacent to requested content that is correlated with the recommended item of the merchandising recommendation 199. In block 715, the network page 196 is provided for rendering by, e.g., a client 109 (FIG. 1).

The merchandising recommendation 199 included in the network page 196 may include one or more links (e.g., "select" button or icon) configured to initiate previewing of the recommended item, purchasing of the recommended item, obtaining additional information about the recommended item, etc. For example, selection of an icon to sample or preview the recommended item may generate a network page including at least a portion of the recommended item such as, e.g., displaying a section of a book or playing some or all of a song. Selecting an icon to purchase the recommended item may initiate the generation and rendering of another network page 196 to facilitate the collection of purchasing information from the user, before acquiring the recommended item. Satisfactory completion of the purchasing process allows the file service 118 to store a data object 184 (FIG. 1) corresponding to the data associated with the recommended item in data store 178 (FIG. 1) and create a corresponding file 133 in the file system 130. The stored data object 184 may be copied from another data object 184 in the data store 178 or may be uploaded and saved from an online retailer. In other implementations, selecting an icon to purchase the recommended item automatically initiates purchase (and storage) of the recommended item by the file service 118 using purchasing information available in the account data 127.

Figure 10:
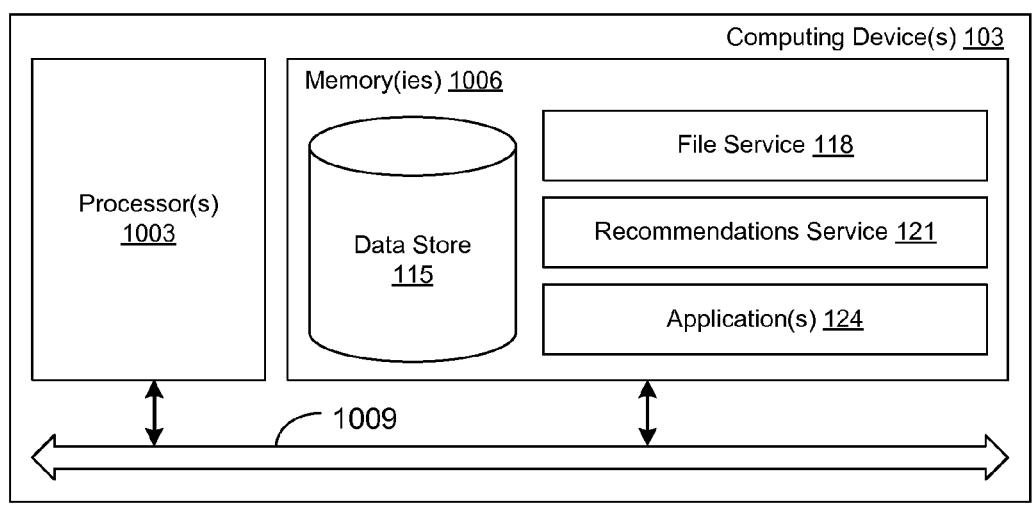
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the file service 118, the recommendations service 121, the applications 124, and potentially other applications. Also stored in the memory 1006 may be a data store 115 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 112 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the file service 118, the recommendations service 121, the applications 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-6 show the functionality and operation of an implementation of portions of the file service 118 and the recommendations service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 2-6 show a specific order of execution, it is understood that the order of execution may differ from that which is depicted. For example, the order of execution of two or more blocks may be scrambled relative to the order shown. Also, two or more blocks shown in succession in FIGS. 2-6 may be executed concurrently or with partial concurrence. Further, in some embodiments, one or more of the blocks shown in FIGS. 2-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 118, the recommendations service 121, and the applications 124, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that obtains characteristic information in response to a request from a client to access requested content of a file system associated with a file service account, the characteristic information associated with the requested content of the file system;
   code that correlates the characteristic information associated with the requested content of the file system with characteristic information associated with a plurality of available items;
   code that obtains account behavioral history associated with the file service account;
   code that selects an item among the plurality of available items for recommendation based at least in part upon the correlation of characteristic information and the account behavioral history, the selected item not included in the file system;
   code that generates a network page including at least a portion of the requested content of the file system and a merchandising recommendation for the selected item; and
   code that provides the network page to the client for rendering.

2. The non-transitory computer-readable medium of claim 1, wherein the merchandising recommendation for the selected item comprises:
   a link configured to initiate purchasing of the selected item; and
   a link configured to initiate a preview of the selected item.

3. A method, comprising:
   obtaining, in at least one computing device, characteristic information in response to a request from a client to access requested content of a file system associated with a file service account, the characteristic information associated with the requested content of the file system;
   determining, in the at least one computing device, a recommended item from a plurality of available items based at least in part upon the characteristic information associated with the requested content, the recommended item not included in the file system;
   generating, in the at least one computing device, a merchandising recommendation for the recommended item in response to determining the recommended item; and
   generating, in the at least one computing device, a network page including at least a portion of the requested content of the file system and the merchandising recommendation.

4. The method of claim 3, further comprising:
   obtaining, in the at least one computing device, the characteristic information associated with a plurality of available items; and
   wherein determining the recommended item from the plurality of available items is based at least in part upon the characteristic information associated with the requested content and characteristic information associated with the plurality of available items.

5. The method of claim 4, wherein determining the recommended item comprises:
   determining correlations between the requested content and the plurality of available items based at least in part upon the characteristic information associated with the requested content and the characteristic information associated with the plurality of available items; and
   selecting the recommended item from the plurality of available items based at least in part upon the determined correlations.

6. The method of claim 4, further comprising:
   obtaining, in the at least one computing device, account behavioral history associated with the file service account;
   wherein the recommended item is determined based at least in part upon the characteristic information associated with the requested content, the characteristic information associated with the plurality of available items, and the account behavioral history.

7. The method of claim 6, wherein determining the recommended item comprises:
   determining correlations between the requested content and the plurality of available items based at least in part upon the characteristic information associated with the requested content and the characteristic information associated with the plurality of available items; and
   selecting the recommended item from the plurality of available items based at least in part upon the determined correlations and the account behavioral history.

8. The method of claim 7, wherein the account behavioral history includes a pattern of acquiring files having a common characteristic.

9. The method of claim 3, wherein the merchandising recommendation for the recommended item includes a link configured to initiate a preview of the recommended item.

10. The method of claim 9, wherein initiating the preview of the recommended item comprises generating another network page including at least a portion of the recommended item.

11. The method of claim 9, wherein initiating the preview of the recommended item comprises generating another network page configured to play at least a portion of the recommended item.

12. The method of claim 9, wherein initiating the preview of the recommended item comprises updating an account behavioral history associated with the file service account to include accessing of the recommended item.

13. The method of claim 3, wherein the merchandising recommendation for the recommended item includes a link configured to initiate purchasing of the recommended item.

14. The method of claim 13, wherein purchasing the recommended item comprises storing a data object corresponding to data associated with the recommended item and creating a file in the file system, wherein the file includes a data object reference corresponding to the stored data object.

15. The method of claim 14, wherein the stored data object is copied from another data object in a data store.

16. The method of claim 14, wherein the stored data object is uploaded and saved from an online retailer.

17. The method of claim 13, wherein purchasing the recommended item further comprises updating an account behavioral history to include purchasing of the recommended item.

18. The method of claim 3, further comprising providing, by the at least one computing device, the network page for rendering by the client.

19. A system, comprising:

at least one computing device; and a file service executable in the at least one computing device, the file service comprising:

logic that obtains characteristic information in response to a request from a client to access requested content of a file system associated with a file service account, the characteristic information associated with the requested content of the file system;

logic that obtains a merchandising recommendation for a recommended database based at least in part upon the characteristic information associated with the requested content, the recommended item not included in the file system; and logic that generates a network page including at least a portion of the requested content of the file system and the merchandising recommendation.

20. The system of claim 19, further comprising a recommendations service executable in the at least one computing device, the recommendations service comprising:

logic that obtains at least a portion of the characteristic information associated with the requested content of the file system;

logic that determines correlations between a plurality of available items and the requested content based at least in part upon the characteristic information associated with the requested content and characteristic information associated with the plurality of available items; and logic that selects at least one available item for recommendation by the merchandising recommendation based at least in part upon the determined correlations.

21. The system of claim 20, wherein the recommendations service further comprises:

logic that obtains account behavioral history associated with the file service account; and logic that determines a behavioral pattern associated with the requested content based at least in part upon the account behavioral history;

wherein selection of the at least one available item for recommendation by the merchandising recommendation is further based at least in part upon characteristic information corresponding to the behavioral pattern associated with the requested content.

22. The system of claim 21, wherein the behavioral pattern is a pattern of accessing files of the file system that have a common characteristic with the requested content.

23. The system of claim 20, wherein the plurality of available items includes items available for purchasing through the file service.

24. The system of claim 20, wherein the plurality of available items includes items available for purchasing through an online retailer.

25. The system of claim 19, wherein the merchandising recommendation includes a link configured to initiate a preview of the recommended item.

26. The system of claim 25, wherein the link is an icon configured to initiate generation of another network page for previewing the recommended item when selected.

27. The system of claim 19, wherein the merchandising recommendation includes an image of the recommended item and a title of the recommended item.

* * * * *